US012572317B2

(12) United States Patent
Han et al.

(10) Patent No.: US 12,572,317 B2
(45) Date of Patent: Mar. 10, 2026

(54) WIRELESS DEVICE

(71) Applicant: LG ELECTRONICS INC., Seoul (KR)

(72) Inventors: Donghee Han, Seoul (KR); Yoonsuk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/726,056

(22) PCT Filed: Jan. 4, 2022

(86) PCT No.: PCT/KR2022/000093
§ 371 (c)(1),
(2) Date: Jul. 1, 2024

(87) PCT Pub. No.: WO2023/132377
PCT Pub. Date: Jul. 13, 2023

(65) Prior Publication Data
US 2025/0094115 A1 Mar. 20, 2025

(51) Int. Cl.
*G06F 3/14* (2006.01)
*H04W 76/14* (2018.01)
*G06F 3/0482* (2013.01)

(52) U.S. Cl.
CPC .......... *G06F 3/1454* (2013.01); *H04W 76/14* (2018.02); *G06F 3/0482* (2013.01)

(58) Field of Classification Search
None
See application file for complete search history.

(56) References Cited

U.S. PATENT DOCUMENTS

2016/0094648 A1    3/2016  Han et al.
2021/0183336 A1*   6/2021  Hassan .................. G09G 5/363

FOREIGN PATENT DOCUMENTS

EP        3291565      3/2018
EP        3920530     12/2021

OTHER PUBLICATIONS

European Patent Office Application Serial No. 22918914.7, Search Report dated Nov. 21, 2024, 10 pages.

* cited by examiner

*Primary Examiner* — Omar S Parra
(74) *Attorney, Agent, or Firm* — LEE, HONG, DEGERMAN, KANG & WAIMEY

(57) ABSTRACT
A wireless device for providing a service for screen sharing with an external device according to an embodiment of the present invention may: generate a second pin code when one-way pairing from the wireless device to the external device is completed through a first pin code; and transmit a pairing request command indicating to request pairing with the wireless device to the external device through the generated second pin code.

13 Claims, 13 Drawing Sheets

Previous

✓ 2 3

Enter Code

Enter the below code to the TV you want to connect.

3 4 7 7 6 2 2 8

Valid time 1:49

Cancel

950

Enter TV connection code

Enter the 8-digit number displayed on the TV

| 1 | 2 | 3 |
| 4 | 5 | 6 |
| 7 | 8 | 9 |
|   | 0 | ⟨X⟩ |

OK        Cancel        Block

1000

1010        1030

| Living room TV | □ Send Video | □ Get Video | □ Learn more about t... |

1100

Device  List paired with TV A

Select the device you want to send the video to.

Device  List paired with TV A

Select the device that will receive the video.

Device  List paired with TV A

Select the device that will receive the video.

| 1. TV B | Two-way |
| 2. TV C | One-way |
| 3. TV D | One-way |

Figure 12C:
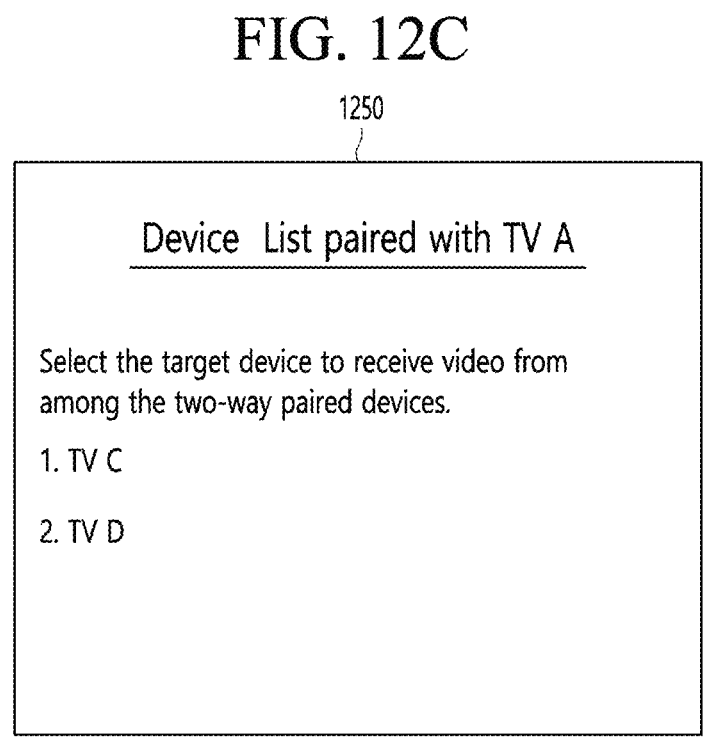

Device  List paired with TV A

Select the target device to receive video from
among the two-way paired devices.

1. TV C

2. TV D

WIRELESS DEVICE

CROSS-REFERENCE TO RELATED APPLICATION(S)

This application is the National Stage filing under 35 U.S.C. 371 of International Application No. PCT/KR2022/000093, filed on Jan. 4, 2022, the contents of which is hereby incorporated by reference herein in its entirety.

TECHNICAL FIELD

This disclosure relates to wireless device, and more specifically, to a wireless system that provides a two-way screen sharing service.

BACKGROUND ART

With recent developments in information and communication technology, various wireless communication technologies are being developed. Among these, wireless LAN (WLAN) is a technology that allows wireless access to the Internet at home, in a business, or in a specific service area using a portable terminals such as personal digital assistants (PDAs), laptop computers, and portable multimedia players (PMPs) based on radio frequency technology.

The introduction of Wi-Fi Direct or Wi-Fi P2P (peer-to-peer), which is a direct communication technology that allows devices to easily connect to each other without a wireless access point (AP), which is basically required in existing wireless LAN systems, is being discussed. According to Wi-Fi Direct standard technology, devices can be connected without going through a complicated setup process, and in order to provide various services to users, it can support data exchange at the communication speed of a general wireless LAN system.

Recently, various Wi-Fi-enabled devices are used, and among them, the number of devices that support Wi-Fi Direct, which allows communication between Wi-Fi devices without an AP, is increasing. In WFA (Wi-Fi Alliance), technology to introduce a platform that supports various services (e.g. Send, Play, Display, Print, etc.) using Wi-Fi Direct links is being discussed. This can be called Wi-Fi Direct Service (WFDS).

Among WFDS, there is a display service that enables screen sharing between devices. The screen sharing service is also called screen mirroring technology in that wireless devices display the same image through video transmission.

However, in the past, when providing a two-way screen sharing service between devices, a two-way pairing process was required, which was inconvenient as the user had to enter the pin code twice for two-way pairing.

DISCLOSURE

Technical Problem

The purpose of the present disclosure is to automatically enable two-way pairing only through the one-way pairing process when providing a two-way screen sharing service between devices.

The purpose of this disclosure is to easily provide a two-way screen sharing service between devices.

Technical Solution

A wireless device that provides a screen sharing service with an external device according to an embodiment of the present disclosure generates a second pin code when one-way pairing from the wireless device to the external device is completed through the first pin code, and a pairing request command that causes the external device to request pairing with the wireless device to the external device through the generated second pin code.

In a wireless display system including a wireless device that provides a screen sharing service according to an embodiment of the present disclosure and an external device, the wireless device generates a second pin code when one-way pairing from the wireless device to the external device is completed through a first pin code, and transmit a pairing request command that causes the external device to request pairing with the wireless device to the external device through the generated second pin code, and the external device transmits a pairing request including the second pin code to the wireless device in response to the pairing request command.

Advantageous Effects

According to various embodiments of the present disclosure, two-way pairing can be automatically performed with a single pin code input for two-way screen sharing between devices.

Accordingly, users can use the two-way screen sharing service without complicated processes, improving user experience.

DESCRIPTION OF DRAWINGS

FIGS. 7A to 7C are ladder diagrams for explaining an operating method of a wireless display system according to an embodiment of the present disclosure.

FIGS. 10 to 12C are diagrams illustrating a screen sharing service menu displayed on the first display device after one-way pairing or two-way pairing is completed according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device that adds a computer support function to the broadcast reception function, internet functions have been added while faithful to the broadcast reception function, making it possible to have a more convenient interface such as a handwriting input device, touch screen, or spatial remote control.

Therefore, in the display device described in the present disclosure, for example, various applications can be freely added or deleted on a general-purpose OS kernel, so various user-friendly functions can be performed. More specifically, the display device may be, for example, a network TV, HBBTV, smart TV, LED TV, OLED TV, etc., and in some cases, may also be applied to a smartphone.

Figure 1:
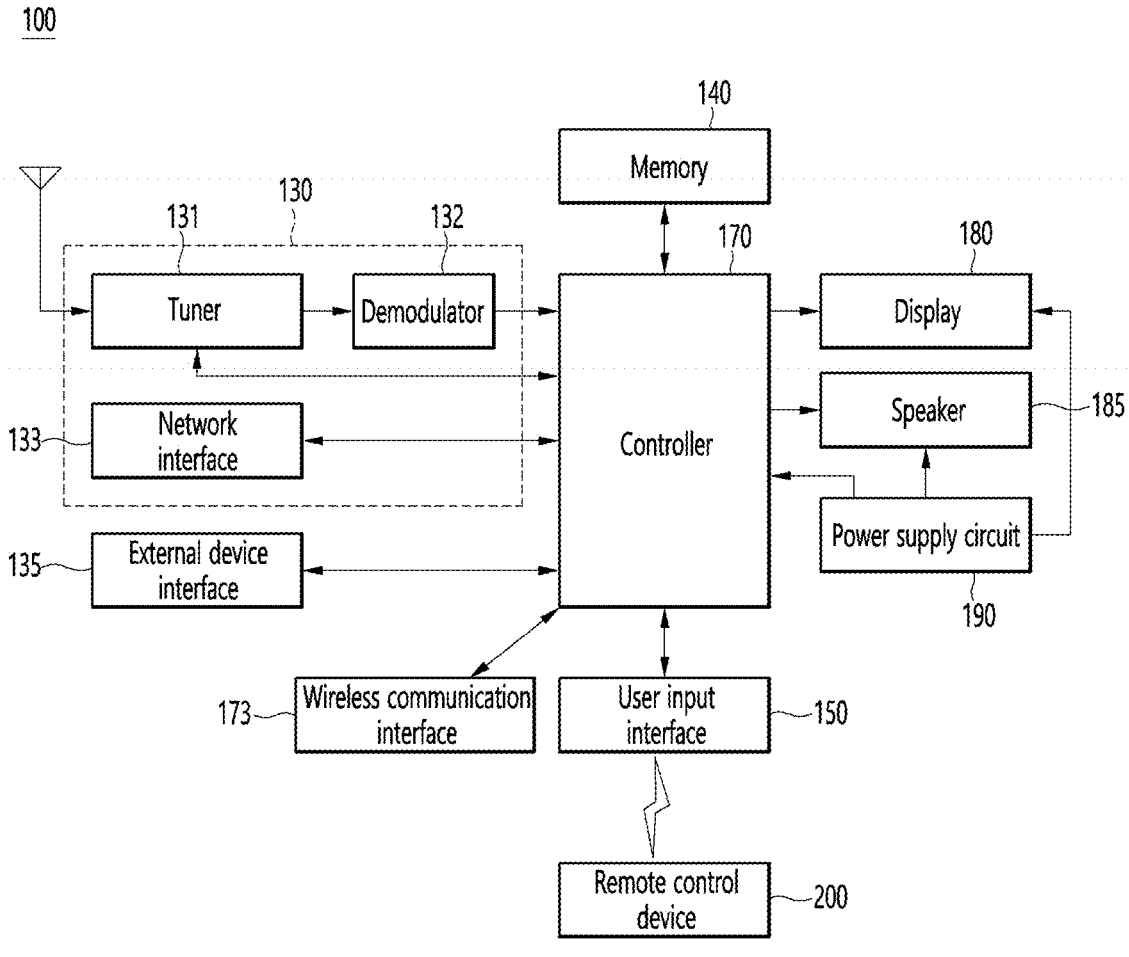
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, auditory signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

Additionally, some of the content data stored in the display device 100 may be transmitted to other users pre-registered on the display device 100, selected users among other electronic devices, or selected electronic devices.

The network interface 133 may access a predetermined web page through the connected network or the other network linked to the connected network. That is, the network interface 133 may transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast video, an external input video, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Furthermore, the display device 100 shown in FIG. 1 is just one embodiment of the present disclosure and thus, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Figure 2:
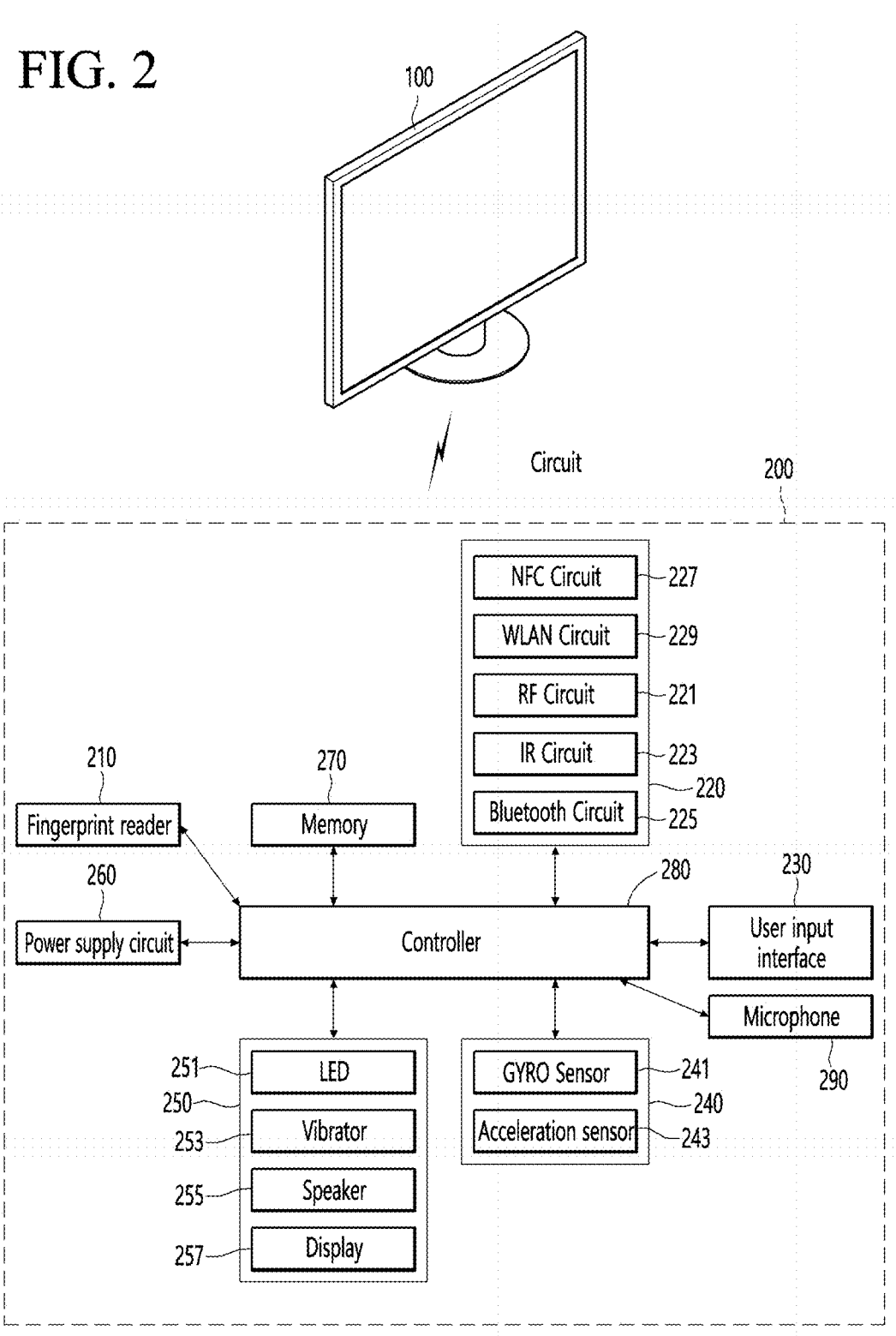
FIG. 2 is a block diagram of a remote control device according to an embodiment of the present disclosure.
Figure 3:
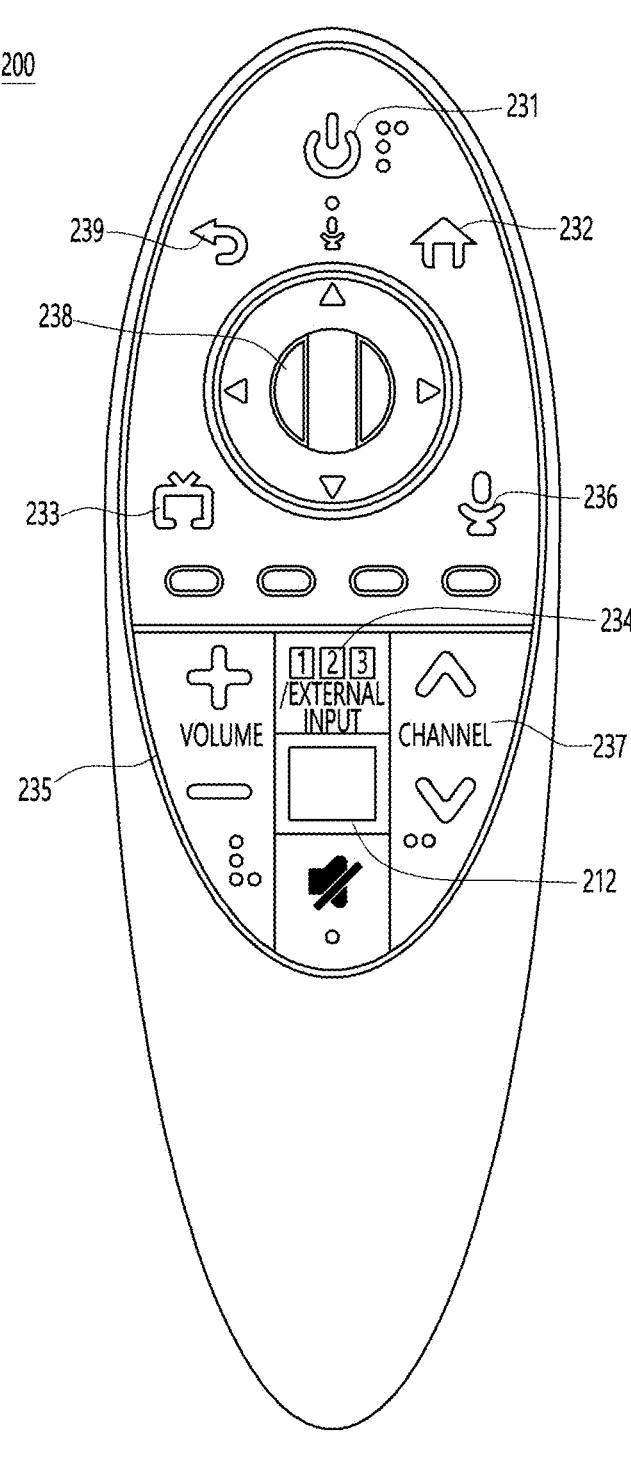
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram of a remote control device according to an embodiment of the present disclosure, and FIG. 3 shows an actual configuration example of a remote control device according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 220.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication interface 220 to the display device 100.

Also, the microphone 290 of the remote control device 200 may obtain a voice.

A plurality of microphones 290 may be provided.

Next, a description will be given referring to FIG. 4.

Figure 4:
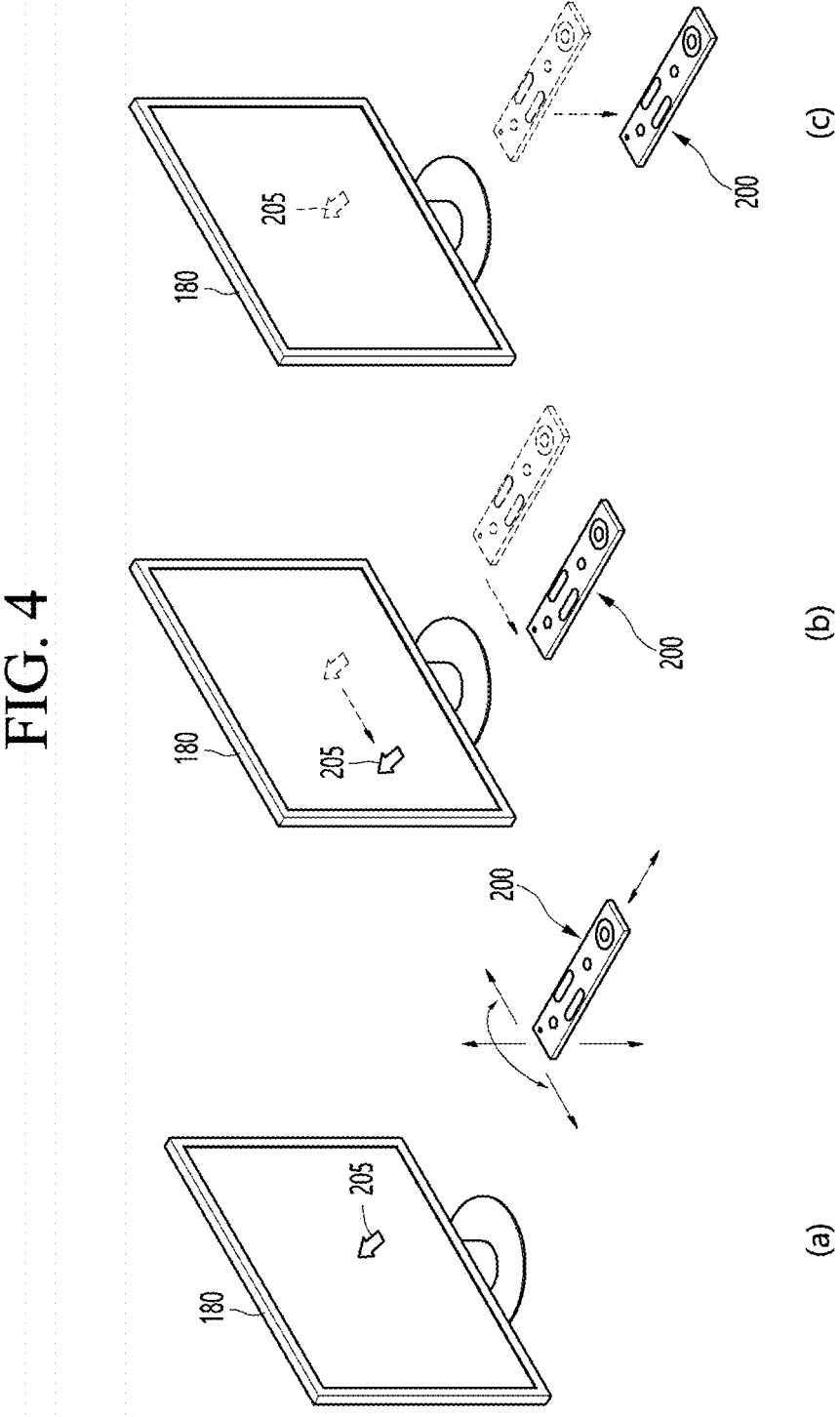
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (*b*) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (*c*) of FIG. 4A, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
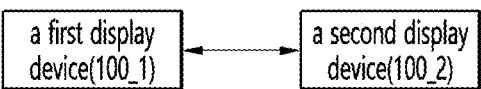
FIG. 5 is a diagram explaining the configuration of a wireless display system according to an embodiment of the present disclosure.

FIG. 5 is a diagram explaining the configuration of a wireless display system according to an embodiment of the present disclosure.

The wireless display system may include a first display device 100_1 and a second display device 100_2.

Each of the first display device 100_1 and the second display device 100_2 may include all of the components shown in FIG. 1.

The first display device 100_1 may be a WFD source, which will be described later, and the second display device 100_2 may be a WFD sink, which will be described later.

The first display device 100_1 may provide a mirroring service with the second display device 100_2.

The first display device 100_1 may wirelessly transmit image data for the image being displayed to the second display device 100_2.

In this case, the Wi-Fi Direct standard can be used to transmit image data.

Next, with reference to FIG. 6, an example in which a WFD session is established between a WFD source and a WFD sink and a screen sharing service is provided will be described.

Figure 6:
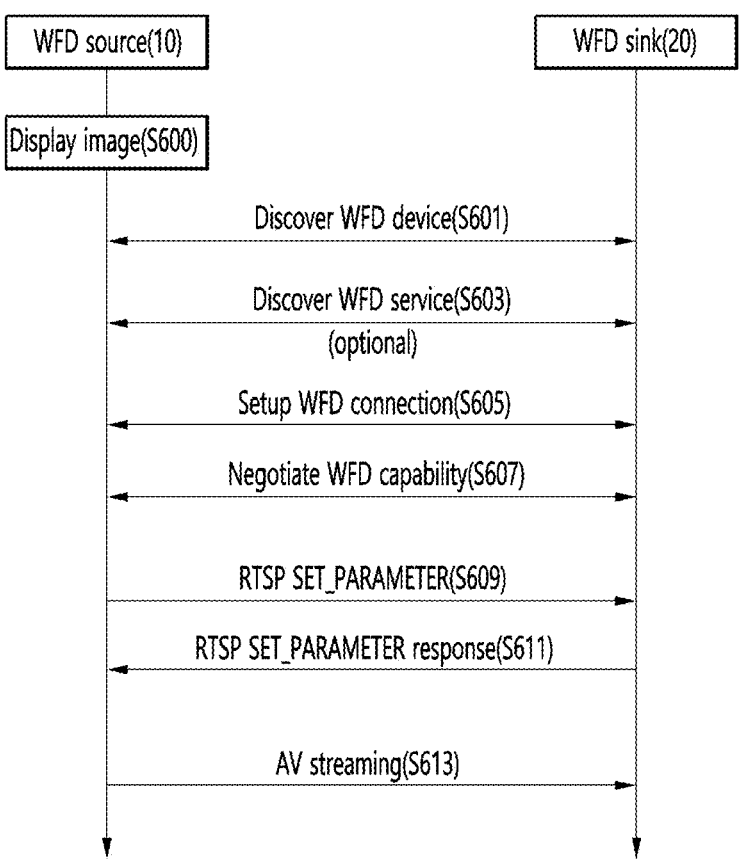
FIG. 6 is a ladder diagram to explain the process in which a screen sharing service is provided by establishing a WFD session between a WFD source and a WFD sink according to an embodiment of the present disclosure.

FIG. 6 is a ladder diagram to explain the process in which a screen sharing service is provided by establishing a WFD session between a WFD source and a WFD sink according to an embodiment of the present disclosure.

One or more of the steps in FIG. 6 may be supported by the Wi-Fi Direct standards document.

Among WFDS, display services may refer to services and applications that enable screen sharing between P2P devices. A P2P service that uses a display service can be called a WFD device, and among WFD devices, a device that supports streaming of multimedia content through a device P2P link may be referred to as a Wi-Fi display (WFD) source, and a device that receives and renders multimedia content from a WFD source device through a P2P link may be referred to as a WFD sink.

The WFD source 10 may be the mobile terminal 500 shown in FIG. 5. Accordingly, the WFD source 10 may include all components of the mobile terminal 500 shown in FIG. 5.

The WFD sink 20 may be the display device 100 shown in FIG. 1. Accordingly, the WFD sink 20 may include all components of the mobile terminal 500 shown in FIG. 1.

Referring to FIG. 6, the WFD source 10 can display an image on the screen (S600).

In one embodiment, the image displayed on the screen may be an image of media content.

In another embodiment, when the WFD source 10 is the mobile terminal 500 shown in FIG. 5, the image displayed on the screen may be the home screen of the mobile terminal 500 and an image that the mobile terminal 500 is displaying such as an execution screen of an application installed on the mobile terminal 500.

Afterwards, the WFD source 10 and the WFD sink 20 may first discover each other's existence prior to setting up the WFD connection through WFD DeviceDiscovery (S601). Specifically, WFD devices can recognize each other's existence through a probe request frame including a WFD Information Element (WFD IE) and probe response frame. WFD information elements may include basic information for establishing optimal connections between WFD devices, such as device type and device status. When the WFD device receives a probe request frame including the WFD IE, it may transmit a probe response frame including its own WFD IE in response. If a WFD device is linked to an AP and operates as a Wi-Fi P2P device, two or more Wi-Fi transceivers logically operate in one physical device. At this time, the Wi-Fi Direct transceiver is used to discover the WFD device. A probe request frame for discovery of a WFD device may include not only the WFD IE but also a P2P information element (IE), which may be decoded by the Wi-Fi Direct transceiver.

Afterwards, the WFD source 10 and the WFD sink 20 may discover each other's service capabilities prior to setting up the WFD connection (S603). Specifically, when one WFD device transmits a service discovery request frame including the WFD capability as an information subelement, the other WFD device responds by sending a service discovery request frame including its WFD capability as an information subelement. The service discovery procedure is an optional procedure, and a WFD device that supports the service discovery procedure can perform the service discovery procedure with a discovered WFD device that supports the service discovery procedure. To perform a service discovery procedure, the probe request frame and response frame used in the device discovery procedure may include information indicating whether the WFD device has the ability to support the service discovery procedure.

Afterwards, the WFD source 10 or the WFD sink 20 may select a peer WFD device for WFD connection setup. The peer WFD device that will proceed with WFD connection setup may be selected based on the user's input, or the peer WFD device that will automatically proceed with WFD connection setup may be selected according to policy.

Afterwards, the WFD device can select a WFD connection setup method with the selected peer WFD device (S605). Specifically, WFD devices can establish a WFD connection with Connectivity Scheme which is either Wi-Fi P2P or TDLS (Tunneled Direct Link Setup). WFD devices can determine connection scheme based on the associated BSSID sub element delivered with a preferred connection (Preferred Connectivity) information and WFD information element.

If WFD setup is successfully performed using Wi-Fi P2P or TDLS between WFD devices, the WFD device can proceed with WFD capability negotiation (S607). Specifically, the WFD source 10 and the WFD sink 20 determine a parameter set that defines the audio/video payload during the WFD session by exchanging messages using the RTSP (Real-Time Streaming Protocol) protocol. The WFD source 10 and the WFD sink 20 can exchange their specification information with each other.

The WFD source 10 may inquire about the capabilities of the WFD sink 20 using the RTSP protocol, and the WFD sink 20 may transmit its capability information to the WFD source 10 in response. For example, the WFD sink 20 may transmit resolution information including supportable resolutions to the WFD source 10. For example, the WFD sink 20 may transmit resolution information including a resolution corresponding to an aspect ratio of 16:9 or 4:3, which is a supportable resolution, to the WFD source 10. Here, the resolution corresponding to 16:9 or 4:3 is only an example, and may be a resolution corresponding to a screen ratio in which the horizontal length is longer than the vertical length.

Conversely, the WFD source 10 may also transmit resolution information including supportable resolutions to the WFD sink 20.

During the WFD capability negotiation process with the WFD sink 20, the WFD source 10 may transmit the necessary request message to the WFD sink 20 using the RTSP protocol (S609). For example, the WFD source 10 sends a message including the content of delivering an image of video content corresponding to a specific resolution based on the resolution information received from the WFD sink 20 using the RTSP protocol. More specifically, the WFD source 10 can select one of a plurality of resolutions that the WFD sink 20 can support, and transmit a message to transmit an image of video content with the selected resolution the WFD sink 20. That is, the WFD source 10 can select one of a plurality of resolutions and transmit a message indicating that it will transmit an image of the selected resolution to the WFD sink 20.

The WFD sink 20 may transmit a response message through the RTSP protocol based on the request message received from the WFD source 10 (S611).

In one embodiment, the resolution selected by the WFD source 10 may not be included in resolutions that the WFD source 10 can support. That is, the resolution of the image being displayed by the WFD source 10 may not be included in resolutions that the WFD sink 20 can support. Steps S609 and S611 may be included in the WFD capability negotiation step (S607).

When the WFD capability negotiation step is successfully terminated, a WFD session (or Miracast session) between the WFD source 10 and the WFD sink 20 is established, and audio and video content from the WFD source 10 to the WFD sink 20 may be streamed (S613).

In one embodiment, the WFD sink 20 may display the entire image of streamed video content.

In the drawings below, the WFD source 10 and the WFD sink 20 will be described assuming that they are the display device 100 described in FIG. 1.

Accordingly, the WFD source 10 may include all components of the mobile terminal 500 shown in FIG. 5. Likewise, the WFD sink 20 may also include all components of the display 100 shown in FIG. 1.

Figure 7A:
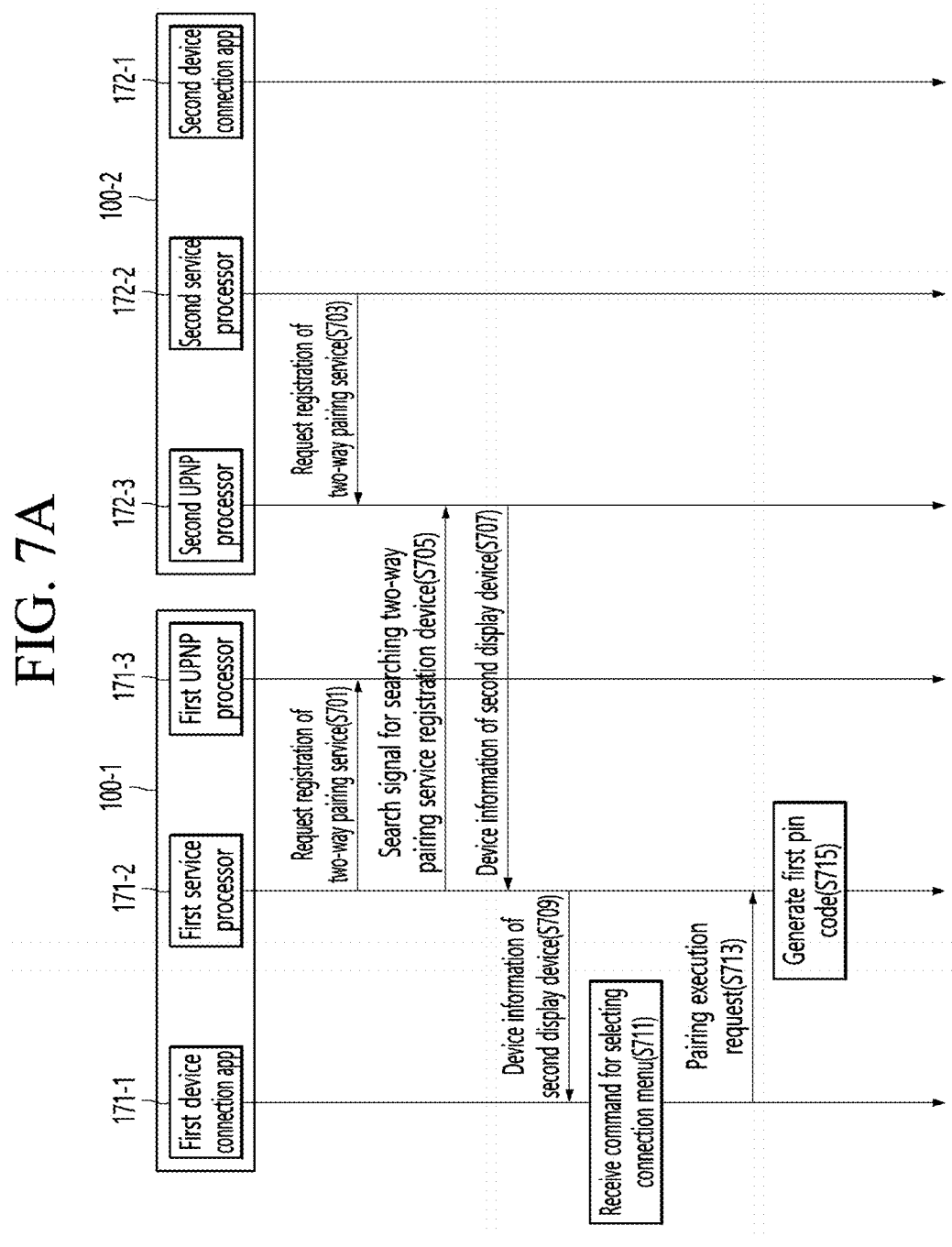
Figure 7B:
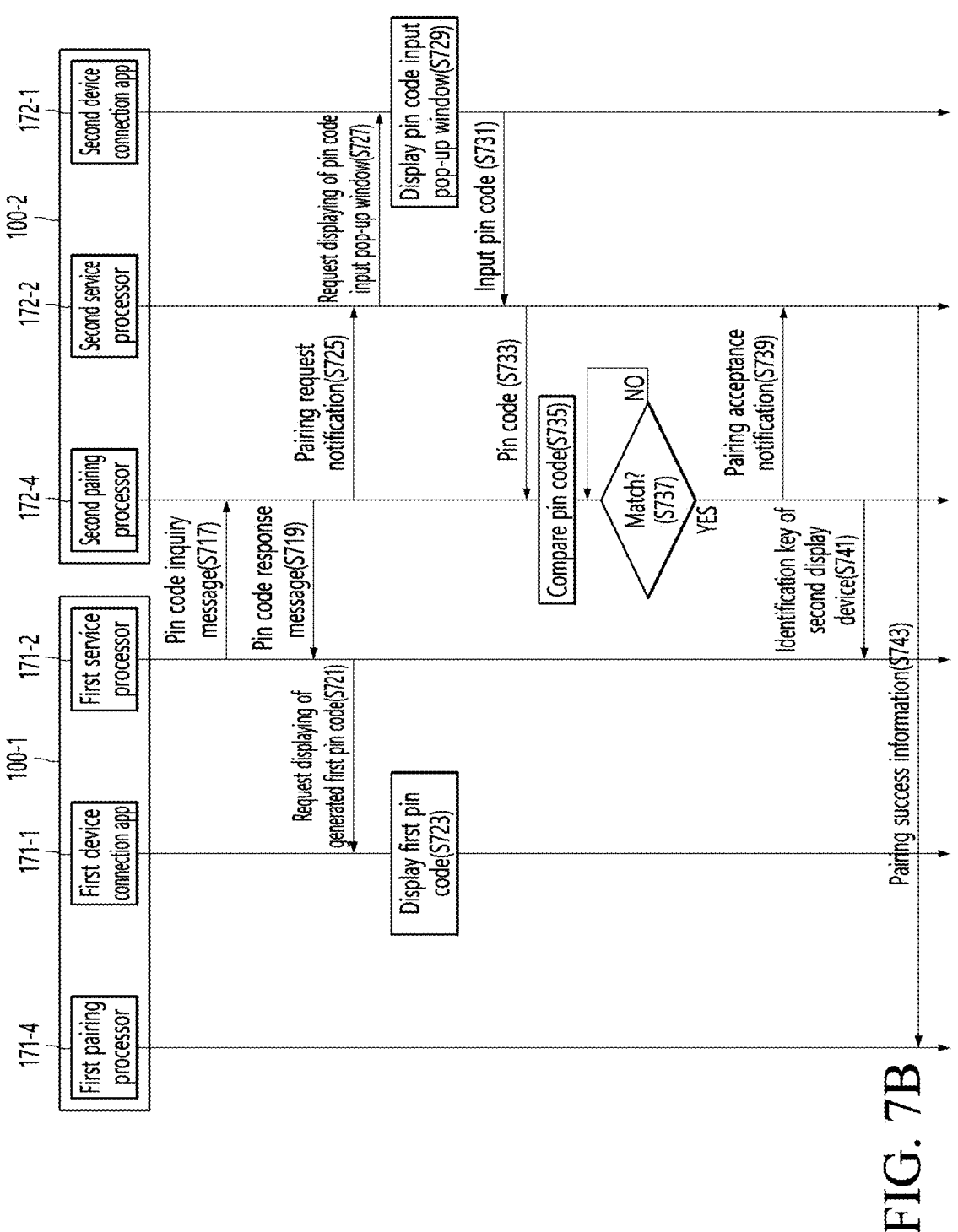
Figure 7C:
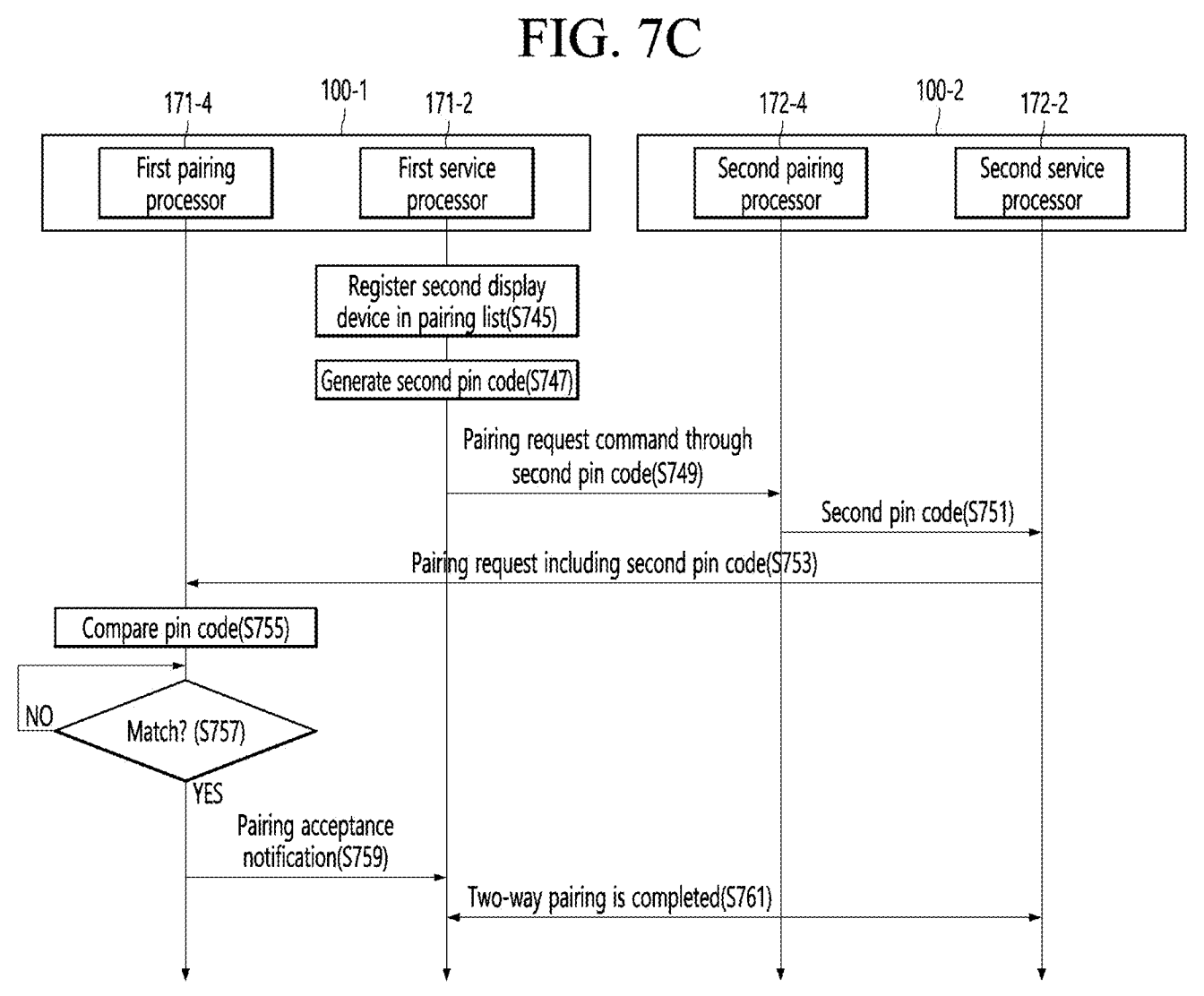

FIGS. 7A to 7C are ladder diagrams for explaining an operating method of a wireless display system according to an embodiment of the present disclosure.

In FIGS. 7A to 7C, the first display device 100_1 may be a WFD sink described in FIG. 6, and the second display device 100_2 may be a WFD source.

The first display device 100-1 may include a first device connection app 171-1, a first service processor 171-2, and a first UPNP (Universal Plug And Play) processor 171-3.

The first device connection app 171-1, the first service processor 171-2, and the first UPNP (Universal Plug And Play) processor 171-3 may be included in a first controller (not shown, corresponding to 170) of the first display device 100-1.

The second display device 100-2 may include a second device connection app 172-1, a second service processor 172-2, and a second UPNP (Universal Plug And Play) processor 172-3.

The second device connection app 172-1, the second service processor 172-2, and the second UPNP (Universal Plug And Play) processor 172-3 may be included in a second controller (not shown, corresponding to 170) of the second display device 100-2.

Each of the first device connection apps 171-1 and 172-1 is an application that provides a wireless connection process for screen sharing service between devices, and may be installed in each device.

Each of the first and second service processors 171-2 and 172-2 may be software or hardware for Miracast service, network service, and device connection app support service.

Each of the first and second UPNP processors 171-3 and 172-3 may be software or hardware that allows network-connected devices to communicate with each other without complicated settings.

Hereinafter, the first display device 100-1 and the second display device 100-2 may perform wireless communication through the wireless communication interface 173 provided in each.

To this end, the wireless communication interface 173 may include a Wi-Fi communication circuit using the Wi-Fi Direct standard.

Referring to FIG. 7A, the first service processor 171-2 requests registration of a two-way pairing service to the first UPNP processor 171-3 (S701), and the second service processor 172-2 requests registration of a two-way pairing service to the second UPNP processor 172-3 (S703).

The two-way pairing service may be a service that transmits the video being displayed to another device or connects so that receiving the video being displayed on another device.

In other words, the two-way pairing service may be a pairing service that allows screen sharing in both directions.

Then, the first service processor 171-2 transmits a search signal for searching a two-way pairing service registration device to the second UPNP processor 172-3 (S705).

The search signal may be a scanning signal to search for a device that has registered a two-way pairing service.

The second UPNP processor 172-3 transmits device information of the second display device 100-2 to the first service processor 171-1 in response to the search signal (S707).

The second UPNP processor 172-3 may periodically transmit an advertising signal indicating the existence of the second display device 100-2 to the outside.

The advertising signal may include device information of the second display device 100-2. Device information may include information indicating that the device can provide two-way pairing service, device identification information, device name and device model name, etc.

The first service processor 171-2 transmits the received device information of the second display device 100-2 to the first device connection app 171-1 (S709).

The first device connection app 171-1 receives a command for selecting a connection menu based on the received device information of the second display device 100-2 (S711).

The connection menu may include device information of the second display device 100-2.

The command for selecting the connection menu may be a command requesting execution of pairing with the second display device 100-2.

The first device connection app 171-1 transmits a pairing execution request to the first service processor 171-2 in response to the received command (S713).

The pairing execution request may be a request to pair the first display device 100-1 with the second display device 100-2. In particular, the pairing execution request may be a one-way pairing request to share the screen of the first display device 100-1 with the second display device 100-2.

The first service processor 171-2 generates a first pin code in response to the received pairing execution request (S715).

The first pin code may be a code generated to pair the first display device 100-1 with the second display device 100-2.

In particular, the first pin code may be a code generated to share the screen displayed by the first display device 100-1 with the second display device 100-2.

Next, with reference to FIG. 7B, steps after step S715 will be described.

In FIG. 7B, each of the first and second pairing processors 171-4 and 172-4 may be hardware or software that transmits and receives data for pairing between devices.

The first service processor 171-2 transmits a pin code inquiry message for inquiring whether the generated first pin code can be received to the second pairing processor 172-4 (S717).

The pin code inquiry message may include the first pin code.

The first service processor 171-2 receives a pin code response message indicating whether the first pin code can be received from the second pairing processor 172-4 in response to transmission of the pin code inquiry message (S719).

The pin code response message may include information indicating whether the first pin code can be received or not.

The first service processor 171-2 requests displaying of the first pin code to the first device connection app 171-1, when it is determined that reception of the first pin code is possible through the pin code response message (S721).

The first device connection app 171-1 displays the first pin code on the display 180 of the first display device 100-1 according to the received request for display of the first pin code (S723).

Meanwhile, the second pairing processor 172-4 transmits a pairing request notification from the first display device 100-1 to the second service processor 172-2 (S725).

The second service processor 172-2 requests displaying of a pin code input pop-up window in response to the pairing request notification from the first display device 100-1 to the second device connection app 172-1 (S727).

The second device connection app 172-1 displays a pin code input pop-up window on the display 180 of the second display device 100-2 in response to a request for displaying a pin code input pop-up window (S729).

The second device connection app 172-1 transmits the input pin code to the second service processor 172-2 (S731), and the second service processor 172-2 transmits the transmitted pin code to the second pairing processor 172-4 (S733).

Users can input the pin code through the pin code input pop-up window. The input pin code may be the code displayed on the first display device 100-1 in step S723.

The second pairing processor 172-4 compares the first pin code and the input pin code (S735) and checks whether the two codes match (S737).

The second pairing processor 172-4 may check whether the first pin code included in the pin code inquiry message in step S717 matches the pin code input by the user.

If the two codes match, the second pairing processor 172-4 transmits a pairing acceptance notification to the second service processor 172-2 (S739), and transmits the identification key of the second display device 100-2 to the first service processor 171-2 (S741).

The identification key of the second display device 100-2 may be a key value that identifies the second display device 100-2.

In response to the pairing acceptance notification (S739), the second service processor 172-2 transmits pairing success information to the first pairing processor 171-4 (S743).

Through this process, one-way pairing between the first display device 100-1 and the second display device 100-2 can be completed. One-way pairing may indicate a connection state in which only one device transmits the image being displayed, and the other device displays the received video.

Two-way pairing can refer to a connection state in which two devices each transmit the image being displayed, or allow another device to receive the image being displayed.

Up to step S743, it indicates that one-way pairing is completed, and therefore the first display device 100-1 transmits the image being displayed to the second display device 100-2, and the second display device 100-2 cannot transmit the image being displayed to the first display device 100-2.

For two-way pairing, steps S701 to S743 must be performed from the perspective of the second display device 100-2.

In this case, the user has the inconvenience of having to enter the PIN code twice for two-way pairing.

In an embodiment of the present disclosure, in order to prevent the inconvenience of having to enter a pin code twice for two-way pairing, when one-way pairing is completed, two-way pairing can be completed automatically.

FIG. 7C is a scenario that occurs after FIG. 7B.

Referring to FIG. 7C, after one-way pairing is completed, the first service processor 171-2 registers the second display device 100-2 in the pairing list (S745).

The first service processor 171-2 may add the second display device 100-2 to the pairing list using the identification key received from the second display device 100-2.

The pairing list may include information about one or more devices paired with the first display device 100-1.

After that, the first service processor 171-2 generates a second pin code (S747) and transmits pairing request command that causes the second display device 100-2 to request pairing with the first display device 100-1 through the second pin code to the second pairing processor 172-4 (S749).

The second pin code may be a code generated for pairing the second display device 100-2 with the first display device 100-2.

In particular, the second pin code may be a code generated to share the screen displayed by the second display device 100-2 with the first display device 100-1.

The pairing request command may be a command to cause requesting pairing to the first display device 100-1 using a second pin code. The pairing request command may include a second pin code.

The second display device 100-2 may request pairing to the first display device 100-1 using a second pin code according to the received pairing request command.

In FIGS. 7A and 7B, since one-way pairing is performed from the first display device 100-1 to the second display device 100-2, the first display device 100-1 can transmit the second pin code to the second display device 100-2.

Accordingly, the first display device 100-1 notifies the second pin code to the second display device 100-2 in advance, and allows the second display device 100-2 to request pairing using the notified second pin code.

The second pairing processor 172-4 transmits the second pin code included in the pairing request command to the second service processor 172-2 (S751).

The second service processor 172-2 transmits a pairing request including a second pin code to the first pairing processor 171-4 (S753).

The first pairing processor 171-4 compares the generated second pin code with the second pin code included in the pairing request (S755), and if they match (S757), sends a pairing acceptance notification to the first service processor 171-2 (S759).

Instead of inputting the user's pin code, the first display device 100-1 only needs to check whether the second display device 100-2 has requested pairing using the second pin code transmitted from itself to the second display device 100-2.

Accordingly, two-way pairing between the first display device 100-1 and the second display device 100-2 is completed (S761).

According to the prior art, in order for the second display device 100-2 to share its screen with the first display device 100-1, a one-way pairing process such as the process of FIGS. 7A and 7B is performed.

In this process, there is an inconvenience in that the user must re-enter the second pin code displayed on the second display device 100-2 in the first display device 100-1.

In the present disclosure, the second pin code to be input to the first display device 100-1 may be notified in advance to the second display device 100-2. The second display device 100-2 can transmit a pairing request to the first display device 100-1 using the notified second pin code.

Accordingly, the user does not need to separately enter the second pin code, thereby eliminating the inconvenience.

Figure 8:
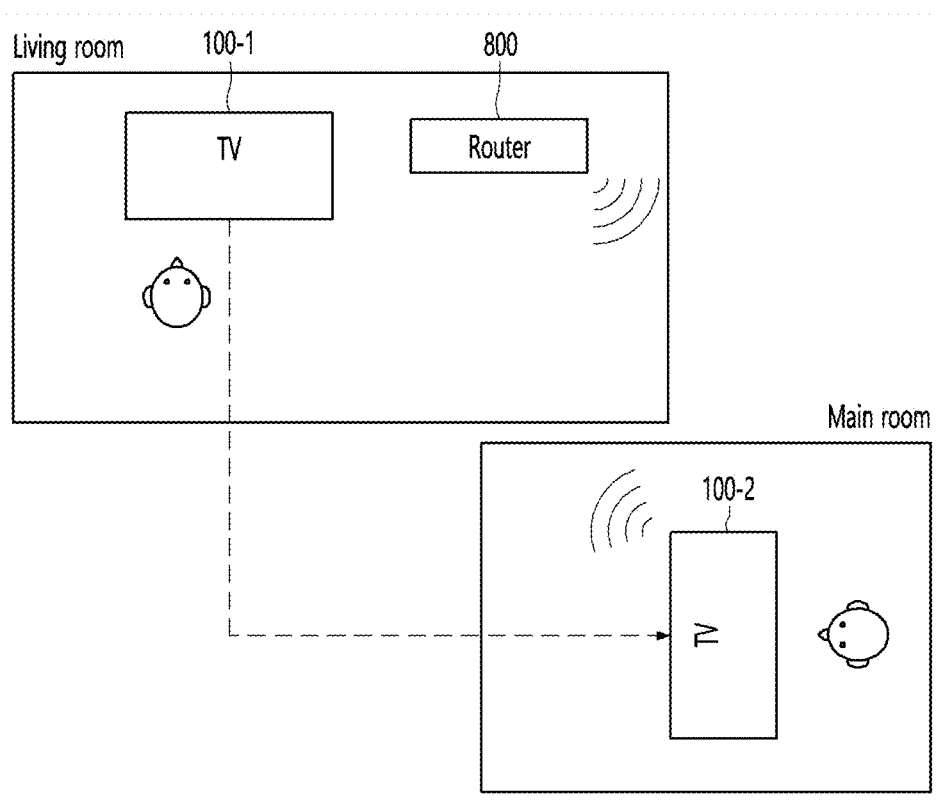
FIG. 8 is a diagram explaining the process of providing a screen sharing service according to an embodiment of the present disclosure.

FIG. 8 is a diagram explaining the process of providing a screen sharing service according to an embodiment of the present disclosure.

Referring to FIG. 8, the first display device 100-1 and the second display device 100-2 may be connected to each other through the router 800. The first display device 100-1 and the second display device 100-2 can exchange data through the router 800.

When one-way pairing is established from the first display device 100-1 to the second display device 100-2, the first display device 100-1 may share the screen being displayed with the second display device 100-2.

When two-way pairing is established between the first display device 100-1 and the second display device 100-2, the first display device 100-1 can share the screen being displayed with the second display device 100-2, and the second display device 100-2 can share the screen being displayed with the first display device 100-1.

Figure 9A:
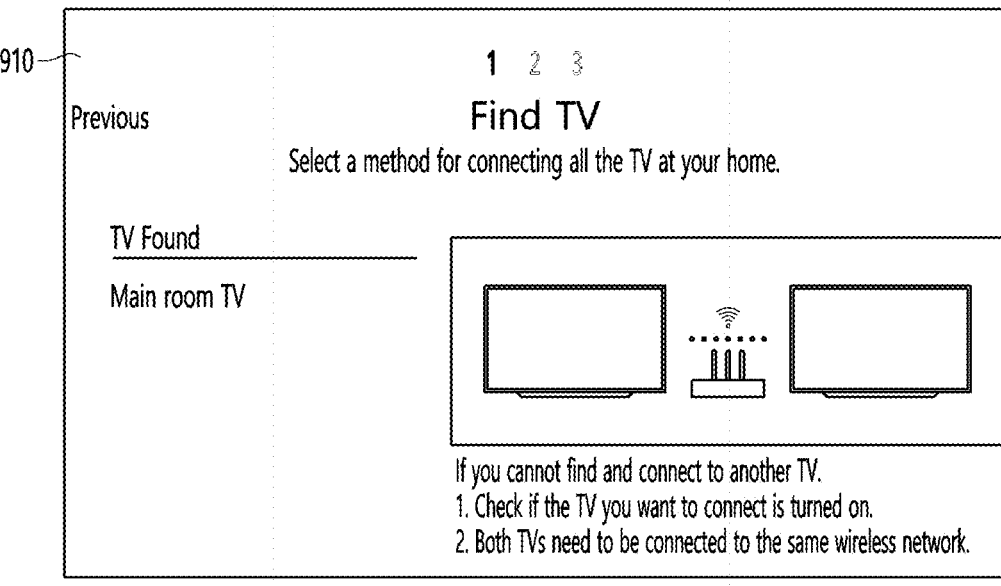
FIGS. 9A to 9C are diagrams illustrating the process of performing two-way pairing according to an embodiment of the present disclosure.
Figure 9B:
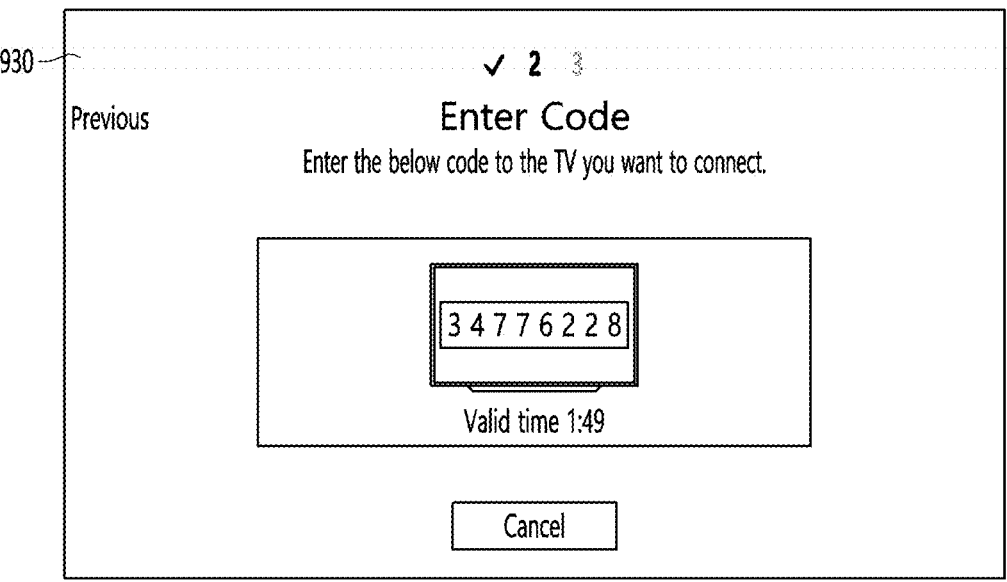
Figure 9C:
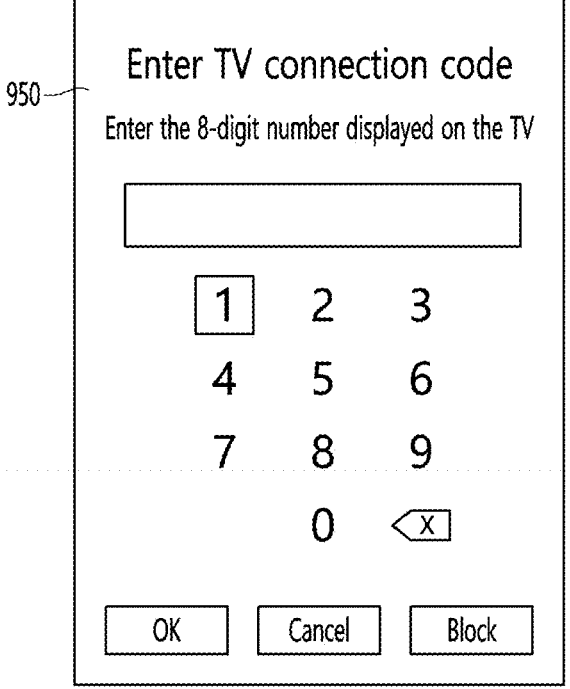

FIGS. 9A to 9C are diagrams illustrating the process of performing two-way pairing according to an embodiment of the present disclosure.

Referring to FIG. 9A, the first display device 100-1 may display a guide screen 910 for pairing.

Then, after steps S701 to S721 of FIG. 7A are performed, as shown in FIG. 9B, the first display device 100-2 displays a pin code generation screen 930 including the first pin code.

Afterwards, as shown in FIG. 9C, the second display device 100-2 may display a pin code input pop-up window 950.

When the pin code matching the first pin code is input through the pin code input pop-up window 950, one-way pairing from the first display device 100-1 to the second display device 100-2 may be performed.

When one-way pairing from the first display device 100-1 to the second display device 100-2 is completed, according to the embodiment of FIG. 7C, one-way pairing from the second display device 100-2 to the first display device 100-1 may be automatically performed.

As a result, two-way pairing between the first display device 100-1 and the second display device 100-2 can be completed.

When two-way pairing between the first display device 100-1 and the second display device 100-2 is completed, each device may display a notification indicating that the two-way pairing has been completed.

FIGS. 10 to 12C are diagrams illustrating a screen sharing service menu displayed on the first display device after one-way pairing or two-way pairing is completed according to an embodiment of the present disclosure.

Figures 10, 11:
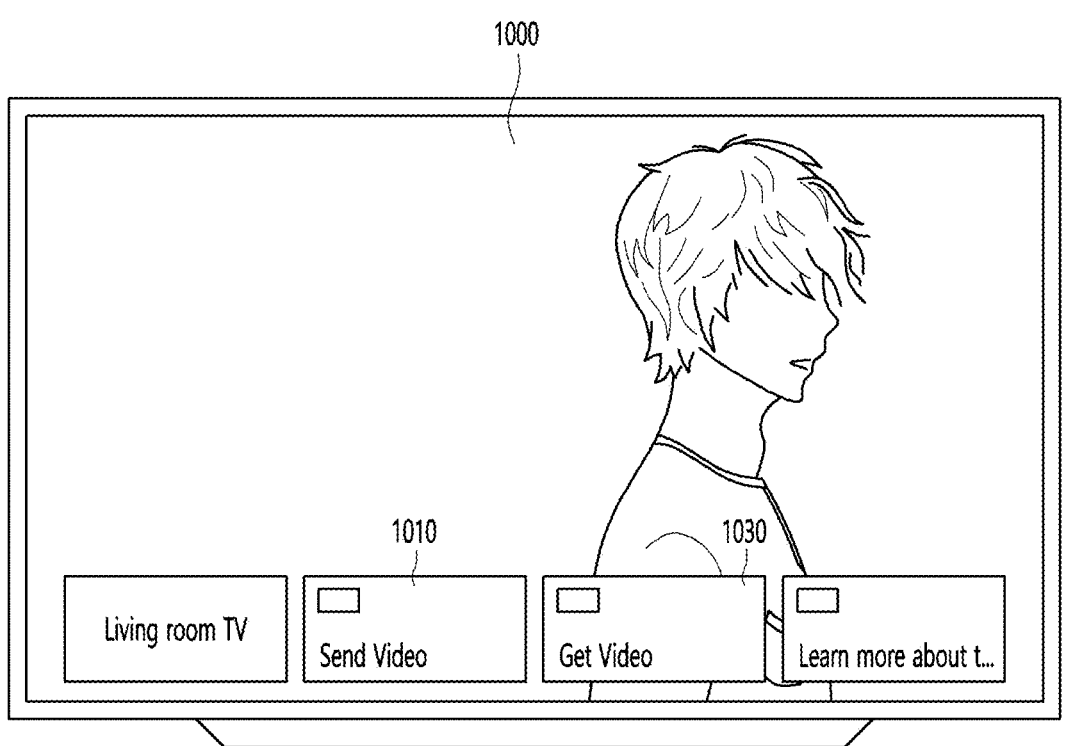

Referring to FIG. 10, the first display device 100-1 may display a transmission menu 1010 and a reception menu 1030.

The first display device 100-1 may display a transmission menu 1010 and a reception menu 1030 by overlapping the content image 1000 being displayed.

The transmission menu 1010 may be a menu for providing a list of one-way paired devices from the first display device 100-1 to an external device.

The reception menu 1030 may be a menu for providing a list of one-way paired devices from an external device to the first display device 100-1.

When the first display device 100-1 receives a command to select the transmission menu 1010, as shown in FIG. 11, a list of transmission target devices 1100 that will share the screen of the first display device 100-1 can be displayed.

The first display device 100-1 may transmit the content image 1000 being displayed to the selected device in response to a command to select a device included in the list of transmission target devices 1100.

When receiving a command to select the reception menu 1030, the first display device 100-1 may display a list of reception target devices, as shown in FIGS. 12A to 12C.

The first list of reception target devices 1210 in FIG. 12A may include information about devices that are one-way paired from an external device to the first display device 100-1.

When receiving a command to select a device included in the first list of reception target devices 1210, the first display device 100-1 receives the image displayed by the selected device and displays a mirrored image.

The second list of reception target devices 1230 in FIG. 12B may include information about devices that are one-way paired from an external device to the first display device 100-1.

When the first display device 100-1 receives a command to select a device included in the second list of reception target devices 1230, it receives the image displayed by the selected device and displays a mirrored image.

The second list of reception target devices 1230 can display distinguishably between devices that are two-way paired with the first display device 100-1 and devices that are one-way paired with the first display device 100-1.

For example, TV B is a two-way paired device with the first display device 100-1, and TV C and TV D are one-way paired devices, which can be distinguished by text.

The third list of reception target devices 1250 in FIG. 12C may include information about devices that are two-way paired with the first display device 100-1.

When the first display device 100-1 receives a command to select a device included in the third list of reception target devices 1250, it receives the image displayed by the selected device and displays a mirrored image.

In particular, the third list of reception target devices 1250 may display only devices that are two-way paired with the first display device 100-1.

Meanwhile, two-way or one-way pairing is distinguished in the same way as the second and third lists of reception target devices 1230, 1250, or a list of transmission target devices including only two-way paired devices can also be displayed.

In this way, the user can intuitively check the two-way or one-way paired devices through the transmission menu 1010 or the reception menu 1030.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A wireless device for providing a screen sharing service with an external device comprising:
a display;
a wireless communication interface configured to perform wireless communication with the external device; and a processor configured to control the display and the wireless communication interface,
wherein the processor is configured to:
generate a first pin code according to a pairing execution request to the external device,
transmit a pin code inquiry message to inquire whether the generated first pin code can be received by the external device,
in response to the pin code inquiry message, receive a pin code response message indicating the first pin code can be received,
in response to receiving the pin code response message, display the first pin code on the display, and
when one-way pairing from the wireless device to the external device is completed through the first pin code, generate a second pin code, and transmit a pairing request command that causes the external device to request pairing with the wireless device to the external device through the generated second pin code.

2. The wireless device according to claim 1, wherein the processor is configured to:
receive a pairing request including the second pin code from the external device in response to the pairing request command, and
complete two-way pairing with the external device according to a confirmation procedure of the second pin code included in the pairing request.

3. The wireless device according to claim 2, wherein the processor is configured to:
display a notification indicating that the two-way pairing has been completed on the display.

4. The wireless device according to claim 2, wherein the processor is configured to:
display a transmission menu that provides a list of transmission target devices for transmitting a screen of the wireless device and a reception menu that provides a list of reception target devices for receiving a screen of the external device on the display.

5. The wireless device according to claim 4, wherein devices included in the list of transmission target devices or the list of reception target devices are displayed distinguishably depending on whether the devices are two-way pairing or one-way pairing.

6. The wireless device according to claim 1, wherein the processor is configured to:
when pairing success information is received from the external device, it is determined that the one-way pairing has been completed.

7. A wireless display system including a wireless device that provides a screen sharing service and an external device,
wherein the wireless device is configured to:
generate a first pin code according to a pairing execution request to the external device,
transmit a pin code inquiry message to inquire whether the generated first pin code can be received by the external device,
in response to the pin code inquiry message, receive a pin code response message indicating the first pin code can be received,
in response to receiving the pin code response message, display the first pin code on a display of the wireless device, and
when one-way pairing from the wireless device to the external device is completed through the first pin code, generate a second pin code, and transmit a pairing request command that causes the external device to request pairing with the wireless device to the external device through the generated second pin code,
wherein the external device is configured to:
in response to the pairing request command, transmit a pairing request including the second pin code to the wireless device.

8. The wireless display system according to claim 7, wherein the wireless device is configured to complete two-way pairing with the external device according to a confirmation procedure of the second pin code included in the pairing request.

9. The wireless display system according to claim 8, wherein each of the wireless device and the external device displays a notification indicating that the two-way pairing has been completed.

10. The wireless display system according to claim 8, wherein the wireless device is configured to display a transmission menu that provides a list of transmission target devices for transmitting a screen of the wireless device and a reception menu that provides a list of reception target devices for receiving a screen of the external device on the display.

11. The wireless display system according to claim 10, wherein devices included in the list of transmission target devices or the list of reception target devices are displayed distinguishably depending on whether the devices are two-way pairing or one-way pairing.

12. The wireless display system according to claim 7, wherein the external device is configured to:
display a pin code input pop-up window for input of a pin code, and
when a same pin code as the first pin code is input through the pin code input pop-up window, transmit pairing success information to the wireless device.

13. The wireless display system according to claim 12, wherein the wireless device is configured to determine that the one-way pairing is completed when the pairing success information is received from the external device.

* * * * *